United States Patent
Zhu et al.

(10) Patent No.: US 12,238,773 B2
(45) Date of Patent: Feb. 25, 2025

(54) FRAME TRANSMISSION METHOD AND APPARATUS, COMMUNICATION END, AND STORAGE MEDIUM

(71) Applicants: BEIJING XIAOMI MOBILE SOFTWARE CO., LTD., Beijing (CN); BEIJING UNIVERSITY OF POSTS AND TELECOMMUNICATIONS, Beijing (CN)

(72) Inventors: Yajun Zhu, Beijing (CN); Wei Hong, Beijing (CN); Junli Li, Beijing (CN); Yong Li, Beijing (CN)

(73) Assignees: Beijing Xiaomi Mobile Software Co., Ltd., Beijing (CN); Beijing University of Posts and Telecommunications, Beijing (CN)

( * ) Notice: Subject to any disclaimer, the term of this patent is extended or adjusted under 35 U.S.C. 154(b) by 371 days.

(21) Appl. No.: 17/779,544

(22) PCT Filed: Nov. 29, 2019

(86) PCT No.: PCT/CN2019/122105
§ 371 (c)(1),
(2) Date: May 24, 2022

(87) PCT Pub. No.: WO2021/102960
PCT Pub. Date: Jun. 3, 2021

(65) Prior Publication Data
US 2023/0007689 A1   Jan. 5, 2023

(51) Int. Cl.
*H04W 74/0816*   (2024.01)
*H04W 74/00*   (2009.01)

(52) U.S. Cl.
CPC ..... *H04W 74/0816* (2013.01); *H04W 74/002* (2013.01)

(58) Field of Classification Search
CPC ............. H04W 74/0816; H04W 74/002
See application file for complete search history.

(56) References Cited

U.S. PATENT DOCUMENTS 9,326,157 B1   4/2016  Bhorkar et al.
10,225,864 B2 *   3/2019  Wong ................ H04W 72/0446
(Continued)

FOREIGN PATENT DOCUMENTS

CN   103053124 A   4/2013
CN   104581979 A   4/2015
(Continued)

OTHER PUBLICATIONS

International Search Report of International Application No. PCT/CN2019/122105 dated Aug. 28, 2020 with English translation, (6p).
(Continued)

*Primary Examiner* — Michael J Moore, Jr.
(74) *Attorney, Agent, or Firm* — Arch & Lake LLP

(57) ABSTRACT

A frame transmission method, includes: sending, by a first communication end to a second communication end, a first RTS on an unlicensed channel, wherein the first RTS carries a licensed frequency band source indication; receiving, according to the licensed frequency band source indication, an assist-clear to send (A-CTS) that is sent by the second communication end in a retreat state on the licensed channel; and sending, according to the A-CTS, a first clear-request to send (C-RTS) on the unlicensed channel, wherein the first C-RTS is configured for instructing a third communication end to exit the retreat state entered based on the first RTS.

20 Claims, 10 Drawing Sheets

(56) References Cited

U.S. PATENT DOCUMENTS

| | | | |
|---|---|---|---|
| 10,560,891 B2* | 2/2020 | Vutukuri | H04W 74/0816 |
| 2011/0028102 A1* | 2/2011 | Li | H04W 74/0816 455/71 |
| 2012/0044844 A1* | 2/2012 | Trainin | H04W 74/0816 370/445 |
| 2015/0009906 A1 | 1/2015 | Dore et al. | |
| 2015/0334752 A1* | 11/2015 | Li | H04W 72/30 455/418 |
| 2015/0382374 A1* | 12/2015 | Bhorkar | H04W 72/0446 370/330 |
| 2017/0127424 A1 | 5/2017 | Kherani et al. | |
| 2017/0273111 A1 | 9/2017 | Wong et al. | |
| 2017/0280480 A1* | 9/2017 | Wong | H04W 74/002 |
| 2017/0288823 A1* | 10/2017 | Bhushan | H04W 56/002 |
| 2018/0035463 A1* | 2/2018 | Mallik | H04W 16/14 |
| 2018/0098355 A1* | 4/2018 | Islam | H04W 74/0808 |
| 2020/0396769 A1* | 12/2020 | Newman | H04W 72/0446 |
| 2021/0321455 A1* | 10/2021 | Zhu | H04W 74/0816 |
| 2023/0007689 A1* | 1/2023 | Zhu | H04W 74/002 |

FOREIGN PATENT DOCUMENTS

| | | |
|---|---|---|
| CN | 105230102 A | 1/2016 |
| CN | 105657849 A | 6/2016 |
| CN | 109196946 A | 1/2019 |
| CN | 110121214 A | 8/2019 |
| KR | 1020160055044 A | 5/2016 |
| WO | 2016049850 A1 | 4/2016 |
| WO | 2016082069 A1 | 6/2016 |

OTHER PUBLICATIONS

Intel Corporation. "Hidden Node Problem and Potential Remedies for LAA Downlink" 3GPP TSG RAN WG1 Meeting Ad-hoc, R1-151106, Paris, France Mar. 24-26, 2015, (3p).

AT&T, "Closed Loop LBT for License Assisted NR in Unlicensed Bands" 3GPP TSG RAN WG1 Meeting 92bis R1-1804665, Sanya, China, Apr. 16-20, 2018, (5p).

Jie, Xiang. "Medium Access Control Protocols in Cognitive Radio Networks" Wireless Communications and Mobile Computing, Dec. 31, 2010, (19p).

Chairman, Draft Agenda—3GPP Tsg Ran WG1 Meeting #92bis, R1-1803570, Sanya China, Apr. 16-20, 2018, (10p).

AT&T, "Channel Access Procedure Enhancements for NR-U", 3GPP TSG RAN1 Meeting #95, R1-1812865, Spokane, WA, Nov. 12-16, 2018, (7p).

First CNOA issued in Application No. 201980003266.2, dated Oct. 19, 2022, with English translation, (15p).

Intel Corporation, "Hidden Node Problem and Potential Remedies for LAA Downlink", 3GPP TSG RAN WG1 Meeting #80 R1-150504, Athens, Greece, Feb. 9-13, 2015, (3p).

Huawei, HiSilicon, "Coexistence and channel access for NR unlicensed band operations",3GPP TSG RAN WG1 Meeting #94, R1-1808061, Aug. 20-24, 2018, (8p).

Sony, "Channel access for NR unlicensed operations",3GPP TSG RAN WG1 #96bis, R1-1904250, Apr. 8-12, 2019, (5p).

* cited by examiner

FRAME TRANSMISSION METHOD AND APPARATUS, COMMUNICATION END, AND STORAGE MEDIUM

CROSS REFERENCE TO RELATED APPLICATION

The present disclosure is a U.S. National Stage of International Application No. PCT/CN2019/122105, filed on Nov. 29, 2019, the entire content of which is incorporated herein by reference for all purposes.

BACKGROUND

The increase of mobile devices and rapid development of mobile Internet bring about explosive growth of mobile data, which puts forward higher requirements for traffic density, network capacity, user speed, delay and the like. In order to meet challenges, a fifth-generation mobile communication (5G) New Radio (NR) has carried out brand-new air interface design for new scenarios and new frequency bands.

SUMMARY

The present disclosure relates to the field of wireless communication, but is not limited to the field of wireless communication, in particular to a frame transmission method and apparatus, a communication end and a storage medium.

A first aspect of the present disclosure provides a frame transmission method, applied to a first communication end, and including: sending, to a second communication end, a first Request to Send (RTS) on an unlicensed channel, in which the first RTS carries a licensed frequency band source indication; receiving, according to the licensed frequency band source indication, an Assist-Clear to send (A-CTS) that is sent by the second communication end in a retreat state on a licensed channel; and sending, according to the A-CTS, a first Clear-Request to Send (C-RTS) on the unlicensed channel, in which the first C-RTS is used for instructing a third communication end to exit the retreat state entered based on the first RTS.

A second aspect of the present disclosure provides a frame transmission method, applied to a second communication end, and including: receiving, on an unlicensed frequency band, a first RTS sent by a first communication end; and sending, on a licensed frequency band, an A-CTS to the first communication end according to a licensed frequency band source indication carried by the first RTS when the second communication end is in a retreat state, in which the A-CTS is configured to trigger the first communication end to send a first C-RTS on an unlicensed frequency band, and the first C-RTS is used for instructing a third communication end to exit the retreat state, on the unlicensed frequency band, triggered based on the RTS.

A third aspect of the present disclosure provides a frame transmission method, applied to a third communication end, and including: entering into a retreat state after monitoring a first RTS sent by a first communication end on an unlicensed channel; and exiting the retreat state in response to monitoring a first C-RTS on the unlicensed channel after entering into the retreat state.

DETAILED DESCRIPTION

Figure 1:
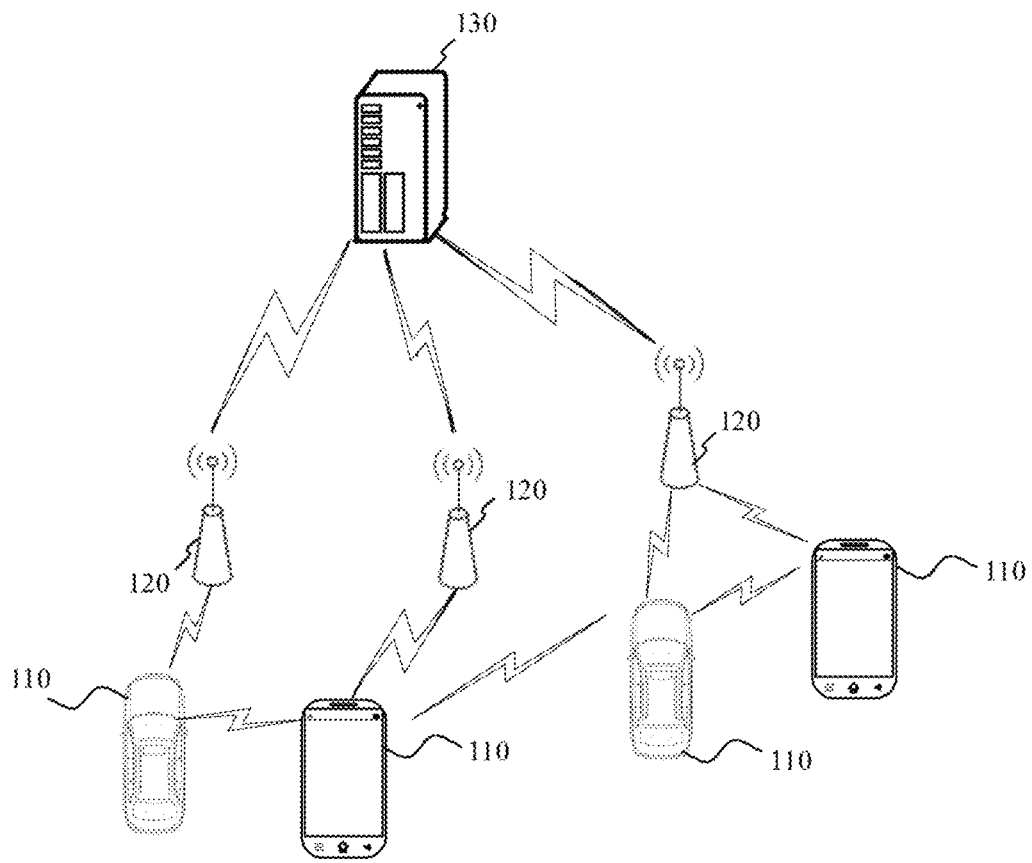
FIG. 1 is a schematic structural diagram of a wireless communication system.

Reference will now be described in detail to examples, which are illustrated in the accompanying drawings. The following description refers to the accompanying drawings in which the same numbers in different drawings represent the same or similar elements unless otherwise represented. The examples described following do not represent all examples consistent with the present disclosure. Instead, they are merely examples of devices and methods consistent with aspects of the disclosure as detailed in the appended claims.

Terms used in the present disclosure are merely for describing specific examples and are not intended to limit the present disclosure. The singular forms "one", "the", and "this" used in the present disclosure and the appended claims are also intended to include a multiple form, unless other meanings are clearly represented in the context. It should also be understood that the term "and/or" used in the present disclosure refers to any or all of possible combinations including one or more associated listed items.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

It should be understood that although terms "first", "second", "third", and the like are used in the present disclosure to describe various information, the information is not limited to the terms. These terms are merely used to differentiate information of a same type. For example, without departing from the scope of the present disclosure, first information is also referred to as second information, and similarly the second information is also referred to as the first information. Depending on the context, for example, the term "if" used herein may be explained as "when" or "while", or "in response to . . . , it is determined that".

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

A unit or module may be implemented purely by software, purely by hardware, or by a combination of hardware and software. In a pure software implementation, for example, the unit or module may include functionally related code blocks or software components, that are directly or indirectly linked together, so as to perform a particular function.

A network architecture and a business scenario described by an example of the present disclosure are for the purpose of illustrating the technical solutions of the examples of the present disclosure more clearly, and do not constitute limitation to the technical solutions provided by the examples of the present disclosure. Those skilled in the art may know that with evolution of the network architecture and occurrence of a new business scenario, the technical solutions provided by the examples of the present disclosure are also applicable for the similar technical problem.

Shortage of spectrum resources is an increasingly severe reality faced by a mobile communication network. Licensed frequency bands, especially high-value low-frequency-band resources, not only are limited in bandwidth, but also are being rapidly consumed by ever growing user groups. In order to meet the challenge of spectrum shortage and increase system capacity, a research plan for an NR-based unlicensed frequency band (New Radio Unlicensed, NR-U) was proposed at the RAN-75 meeting in March 2017, and a research project was started in early 2018.

Although the unlicensed frequency band is rich in resource, in order to ensure fair coexistence between different Radio Access Technologies (RATs) using the frequency band, a Listen Before Talk (LBT) technology based on Clear Channel Assessment (CCA) is introduced in Licensed Assisted Access (LAA), and the introduction of LBT into NR-U is an important way to ensure fair coexistence. However, the current LBT technology can merely detect channel conditions around a sending end. Since the sending end cannot know channel conditions around a receiving end before data transmission, a hidden node problem will be caused.

In order to solve the problem of hidden nodes, a base station is introduced in the related art to participate in coordination of unlicensed channel occupation on the unlicensed frequency bands between different nodes. However, this will result in phenomena of frequent signaling interactions of the base station, large resource occupation, and large access delay of unlicensed channels.

Examples of the present disclosure disclose a frame transmission method and apparatus, a communication end, and a storage medium.

Please refer to FIG. 1, which shows a schematic structural diagram of a wireless communication system provided by an example of the present disclosure. As shown in FIG. 1, the wireless communication system is a communication system based on a cellular mobile communication technology, and the wireless communication system may include: a plurality of terminals 110 and a plurality of base stations 120.

Each terminal 110 may refer to a device that provides voice and/or data connectivity to a user. The terminal 110 may communicate with one or more core networks via a Radio Access Network (RAN), and the terminal 110 may be an Internet of Thing terminal, such as a sensor device, a mobile phone (or called a "cellular" phone) and a computer with the Internet of Thing terminal, for example, may be fixed, portable, pocket-sized, hand-held, computer-built or vehicle-mounted apparatuses. For example, the terminal 110 may be a Station (STA), a subscriber unit, a subscriber station, a mobile station, a mobile, a remote station, an access point, a remote terminal, an access terminal, a user apparatus (user terminal), a user agent, a user device, or a user terminal (user equipment, UE). Alternatively, the terminal 110 may also be a device of an unmanned aerial vehicle. Alternatively, the terminal 110 may also be a vehicle-mounted device, for example, a trip computer with a wireless communication function, or a wireless terminal externally connected to the trip computer. Alternatively, the terminal 110 may also be a roadside device, for example, may be a streetlight, a signal light, or other roadside devices with the wireless communication function.

Each base station 120 may be a network-side device in the wireless communication system. The wireless communication system may be a $4^{th}$ generation mobile communication (4G) system, also known as a Long Term Evolution (LTE) system; alternatively, the wireless communication system may also be a 5G system, also known as a new radio (NR) system or a 5G NR system. Alternatively, the wireless communication system may also be a next-generation system of the 5G system. An access network in the 5G system may be called a New Generation-Radio Access Network (NG-RAN).

The base station 120 may be an evolved base station (eNB) used in the 4G system. Alternatively, the base station 120 may also be a base station (gNB) that adopts a centralized distributed architecture in the 5G system. When the base station 120 adopts the centralized distributed architecture, the base station usually includes a central unit (CU) and at least two distributed units (DUs). The central unit is provided with a protocol stack of a Packet Data Convergence Protocol (PDCP) layer, a Radio Link Control (RLC) protocol layer, and a Media Access Control (MAC) layer; and the distributed unit is provided with a Physical (PHY)

layer protocol stack. The specific implementation of the base station 120 is not limited in the example of the present disclosure.

A wireless connection may be established between the base station 120 and the terminal 110 through a wireless air interface. In different implementations, the wireless air interface is a wireless air interface based on a $4^{th}$ generation mobile communication network technology (4G) standard; alternatively, the wireless air interface is a wireless air interface based on a $5^{th}$ generation mobile communication network technology (5G) standard, for example, the wireless air interface is a new radio; alternatively, the wireless air interface may also be a wireless air interface based on a next generation of 5G mobile communication network technology standard.

In some examples, an End to End (E2E) connection may also be established between the terminals 110, for example, vehicle to vehicle (V2V) communication, vehicle to infrastructure (V2I) communication, vehicle to pedestrian (V2P) communication and other scenarios in vehicle to everything (V2X) communication.

In some examples, the above wireless communication system may further contain a network management device 130.

The plurality of base stations 120 are respectively connected with the network management device 130. The network management device 130 may be a core network device in the wireless communication system. For example, the network management device 130 may be a Mobility Management Entity (MME) in an Evolved Packet Core (EPC) network. Alternatively, the network management device may also be other core network devices, such as a Serving GateWay (SGW), a Public Data Network GateWay (PGW), a Policy and Charging Rules Function (PCRF) or a Home Subscriber Server (HSS). An implementation form of the network management device 130 is not limited in the example of the present disclosure.

Figure 2:
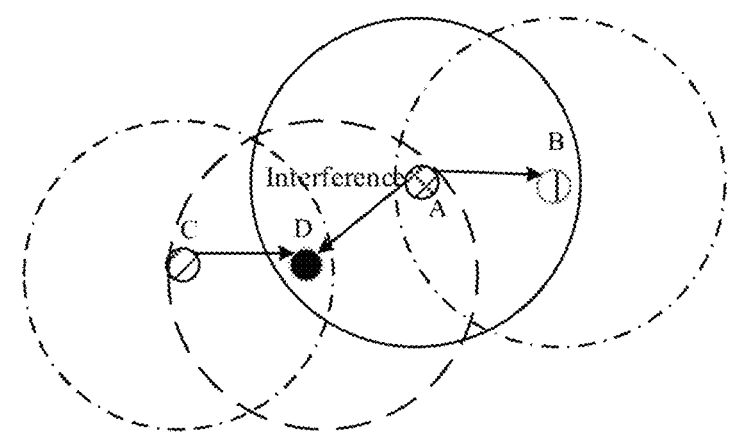
FIG. 2 is a schematic diagram of handshake based on an unlicensed channel provided by an example of the present disclosure.

As shown in FIG. 2, a device C wants to send data to a device D. At this time, a device A is performing downlink transmission to a device B. Since the device C cannot detect the transmission of the device A, the device C sends the data to the device D after LBT is successful. However, the transmission of A will cause interference to the device D at this time.

In order to solve a hidden node problem in NR-U, it was agreed in a 3GPP RAN 1 #92bis meeting to study an enhanced receiver-assisted LBT, for example, a Request To Send (RTS)/Clear To Send (CTS) mechanism in IEEE 802.11 is introduced.

A sending end and a receiving end implement handshake by exchanging request to send (RTS) and clear to send (CTS), and clear channels around the sending end and the receiving end through time fields contained in the RTS and the CTS before completing data transmission and corresponding feedback.

Figure 3:
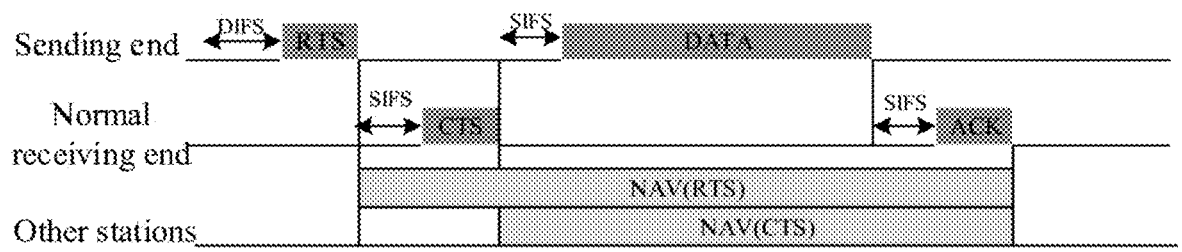
FIG. 3 is a schematic diagram of a handshake mechanism based on an unlicensed channel in a time domain provided by an example of the present disclosure.

As shown in FIG. 3, the sending end first sends the RTS to the receiving end after a carrier monitoring channel is idle and Distributed Inter-frame Spacing (DIFS) time is retreated, nodes that monitor the RTS around the sending end retreat according to Network Allocation Vector (NAV) time indicated by the RTS, and the NAV (RTS) time corresponding to the RTS includes overall needed time in a subsequent sending and feedback process. After receiving the RTS, the receiving end feeds back the CTS to the sending end after a short interframe space (SIFS) of 16 us, other nodes that monitor the CTS retreat according to the indicated NAV time, and the NAV (CTS) time corresponding to the CTS includes the time from the end of CTS to completion of data sending and performing of one corresponding confirmation feedback (Acknowledgement character, ACK).

However, the RTS/CTS mechanism may prevent the receiving end in the retreat time from sending the CTS, which will further lead to a situation that the RTS sent by the sending end makes its surrounding nodes ineffectively retreat. Moreover, if the receiving end does not receive the CTS, the receiving end may send the RTS for multiple times because it does not know the channel occupancy time of other nodes, which will further deteriorate the access efficiency of an unlicensed frequency band.

Figure 4:
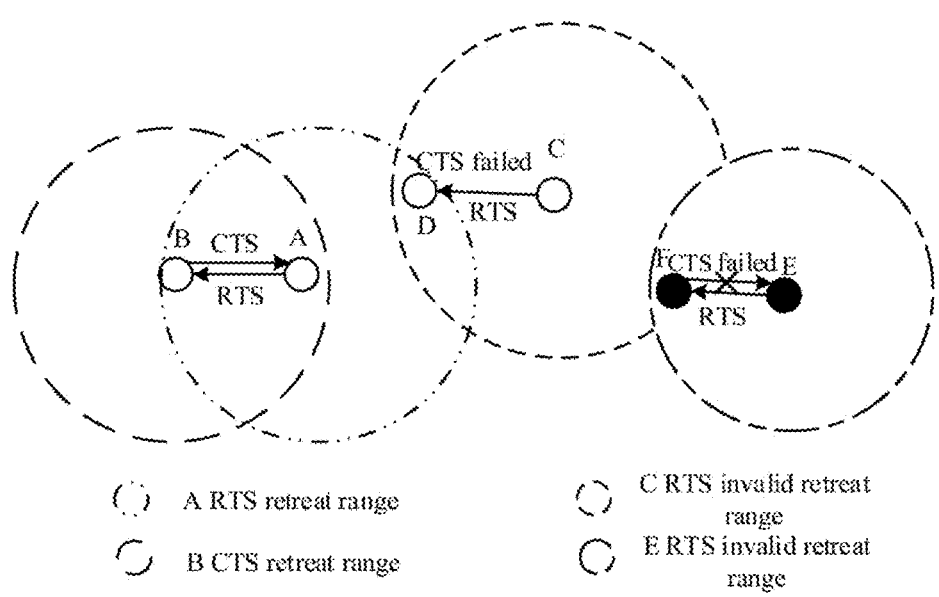
FIG. 4 is a schematic diagram of another handshake based on an unlicensed channel provided by an example of the present disclosure.

A typical scenario is shown in FIG. 4. The device C detects that the channel is idle and sends the RTS to the device D. However, since the device A and the device B are transmitting at this time, the device D that monitor performing of transmission remains in a retreat state. If the CTS of the corresponding device C cannot be fed back due to failure of channel access, and handshake between the device C and the device D fails; but the RTS sent by the device C will still keep a device F in the retreat state, and consequently, the device F cannot perform normal transmission with a device E.

Figure 5:
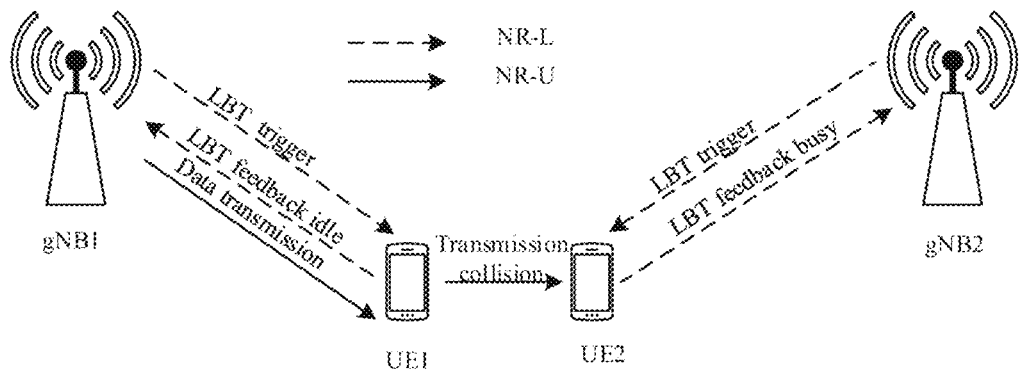
FIG. 5 is a schematic diagram of handshake using a licensed channel based on a base station provided by an example of the present disclosure.

In a licensed frequency band, the receiving end is triggered to perform channel detection in an unlicensed frequency band, and a detection result is fed back to the sending end from the licensed frequency band, and the process is called closed-loop LBT. The sending end decides whether to send data in the unlicensed frequency band based on the channel detection result of the unlicensed frequency band fed back by the receiving end in the licensed frequency band and a channel detection result of the sending end. As shown in FIG. 5, gNB1 serving UE1 sends an LBT trigger on an NR-L carrier to indicate the gNB1 and the UE1 to perform channel sensing on an NR-U carrier at the same time. The UE1 feeds a channel sensing result (LBT feedback idle) back to the gNB ion the NR-L, and the gNB1 performs data transmission on the NR-U carrier based on the sensing result (idle) this time and a feedback result. Since UE2 senses that the channel is busy, data transmission will no longer be performed after gNB2 and UE2 execute closed-loop LBT. Interaction between the base station and the UE adopts the licensed channel (NR-L). On the one hand, the licensed channel is occupied. On the other hand, the base station participates in coordination, consequently, signaling overhead of the base station is large, and transmission delay is large.

Figure 12:
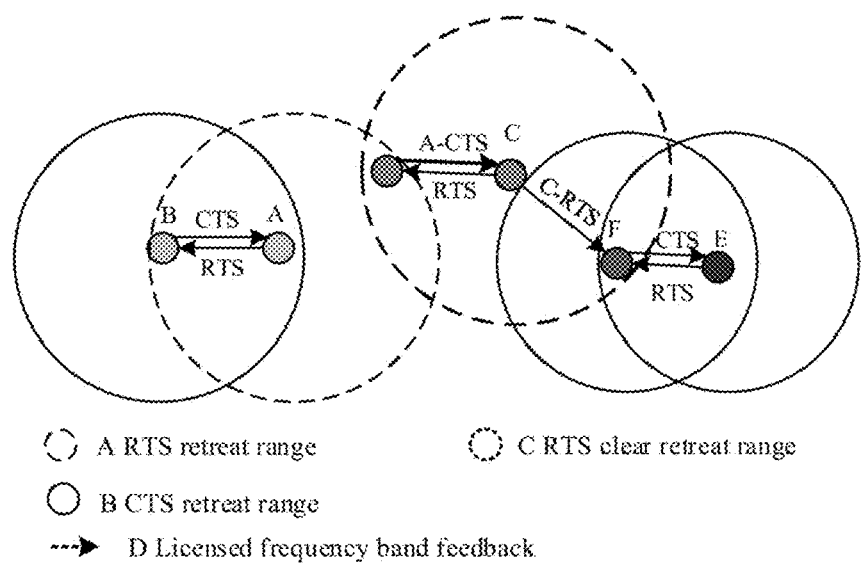
FIG. 12 is another schematic diagram of handshake based on an unlicensed channel provided by an example of the present disclosure.

Larger circles shown in FIGS. 2, 4 and 12 represent corresponding retreat ranges for the corresponding devices to send the RTS and/or the CTS. The devices within the retreat range will enter into the retreat state after detecting the RTS and/or the CTS on the unlicensed channel.

Figure 6:
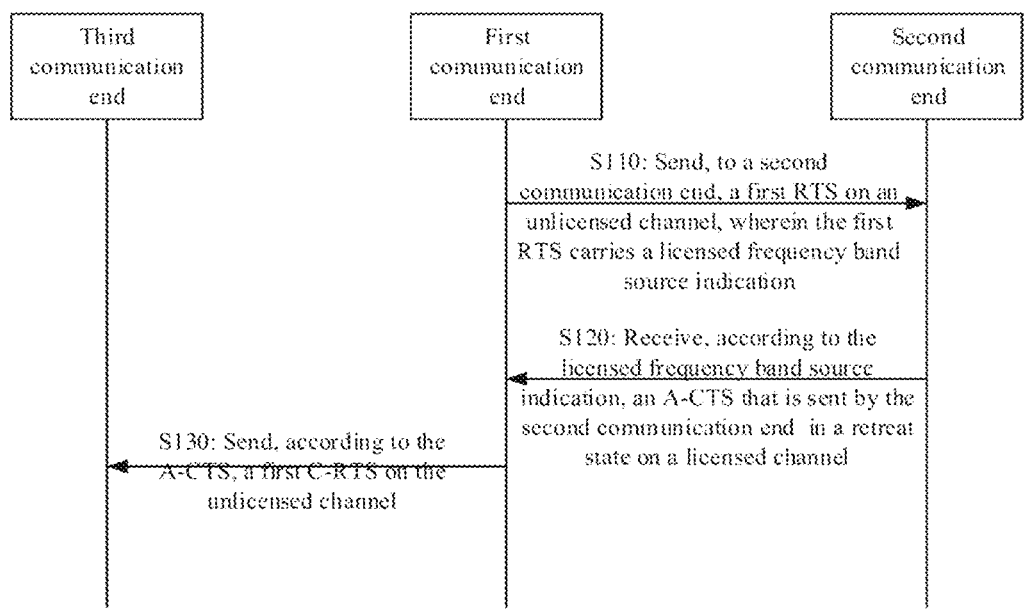
FIG. 6 is a schematic flow diagram of a frame transmission method provided by an example of the present disclosure.

As shown in FIG. 6, the present example provides a frame transmission method, applied to a first communication end, and including:

S110: a first RTS is sent to a second communication end on an unlicensed channel, in which the first RTS carries a licensed frequency band source indication;

S120: an A-CTS that is sent by the second communication end in a retreat state is received on a licensed channel according to the licensed frequency band source indication; and S130: a first C-RTS is sent on the unlicensed channel according to the A-CTS, in which the first C-RTS is used for instructing a third communication end to exit the retreat state entered based on the first RTS.

According to the examples of the present disclosure, the first RTS carries the licensed frequency band source indication. In this way, when the second communication end receives the first RTS, if the second communication end is in the retreat state where data cannot be transmitted on the unlicensed channel, the licensed channel indicated by the licensed frequency band source indication may be used to send the A-CTS indicating that the second communication end is in the retreat state. In this way, after receiving the A-CTS, the first communication end may send the first CTS on the unlicensed channel to indicate that the third communication end around the first communication end exits early from the retreat state entered based on the first RTS. In this way, the third communication end exits the retreat state, which is equivalent to releasing invalid occupation of the unlicensed channel by the first communication end, and thus waste of spectrum resources of the unlicensed channel caused by the invalid occupation of the first communication end is reduced. After the third communication end exits the retreat state, the third communication end can participate in competition of the unlicensed channel within its own space range, thus delay of receiving and sending data by the third communication end can be reduced, and system capacity of the unlicensed channel is improved.

In the example of the present disclosure, the first communication end is a sending end prepared to send data. The second communication end may be a receiving end prepared to receive the data sent by the first communication end.

Before the first communication end prepares to send data, CCA is performed on the unlicensed channel, and in response to detecting that the channel is idle, the first RTS sent to the second communication end is broadcasted on the unlicensed channel. The first RTS is broadcasted and sent on the unlicensed channel, so the third communication end around the first communication end can detect the first RTS, and then enter into the retreat state.

The first RTS is a type of RTS, and the "first" here is merely to distinguish the RTSs sent at different times, and has no specific meaning.

In the example of the present disclosure, the RTS, the C-RTS and the A-CTS are frames used in a handshake mechanism before the first communication end and the second communication end send and receive data on the unlicensed channel, and may be referred to as handshake frames.

The retreat state is a state in which a terminal stops using the unlicensed channel to send and receive data.

In the example of the present disclosure, the first RTS carries the licensed frequency band resource indication. The licensed frequency band resource indication may include: a channel identifier and/or a spectrum identifier of the licensed channel in which the licensed frequency band may be used for sending the A-CTS. In this way, if the second communication end determines that the A-CTS needs to be sent on the licensed channel, the licensed channel to be used may be indicated according to the licensed frequency band resource indication.

In some other examples, the licensed frequency band resource indication may be a resource set indication of the licensed channel.

For example, a licensed channel set capable of being used for the handshake mechanism before sending and receiving data on the unlicensed channel is pre-configured in a wireless communication system. The licensed channel set contains one or more licensed channels. At this time, the licensed frequency band resource indication may directly indicate a set identifier of the set, or an indication identifier for allowing the use of the set.

In the present disclosure, the licensed channel used for the A-CTS may be a reserved resource pre-configured by a network element of an access network or a core network of the wireless communication system. For example, a base station of the access network issues configuration information through high-level signaling, and the configuration information indicates a channel resource of the licensed channel for A-CTS sending. The channel resource may be a reserved resource pre-configured by the wireless communication system. The high-level signaling contains but is not limited to Radio Resource Control (RRC) signaling and/or Media Access Control (MAC) layer signaling.

If the plurality of channel resources for sending the A-CTS are pre-configured, a first sending end may also indicate any one of them through the licensed frequency band resource indication for sending a handshake frame with the second communication end on the unlicensed channel.

In the example of the present disclosure, if the second communication end is in the retreat state, the unlicensed channel cannot be used to send the CTS, but the A-CTS can be sent on the corresponding licensed channel according to the licensed frequency band resource indication carried by the first RTS. In this way, after the first communication end receives the A-CTS, the CTS may be sent on the unlicensed channel, and then when the third communication end around the first communication end hears the CTS on the unlicensed channel, the retreat state entered based on the first RTS will be ended in advance. After exiting the retreat state, the third communication end can participate in competition of the unlicensed channel. On the one hand, resource waste of the unlicensed channel due to the fact that the second communication end is in the retreat state and cannot send the CTS on the unlicensed channel, and consequently, the first communication end occupies the unlicensed channel for a long time but is unable to use the unlicensed channel to send data to the second communication is reduced. On the other hand, the third communication end within a predetermined range around the first communication end may end the retreat state in advance. In response to determining that the third communication end is far away from the second communication end, the third communication end can use the unlicensed channel with a high probability to perform data receiving and sending, thus resource cost of the unlicensed channel in different regions is achieved, resource effective use of the unlicensed channel is improved, and system capacity of the unlicensed channel is improved as a whole.

Figure 7:
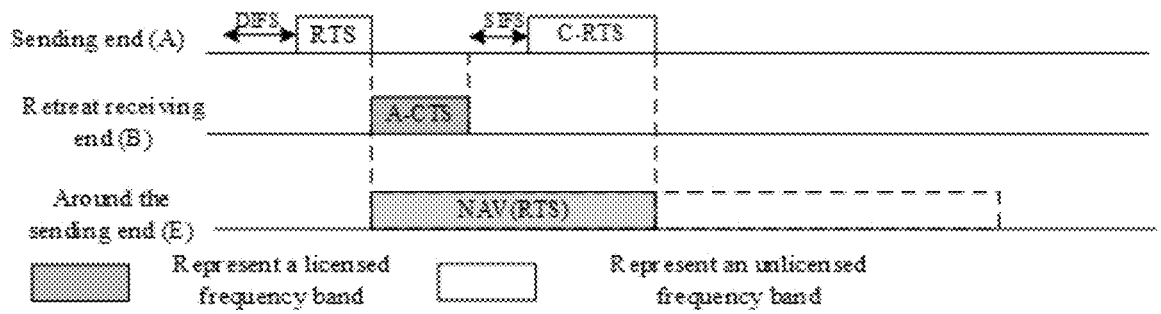
FIG. 7 is a schematic diagram of a handshake mechanism based on an unlicensed channel in a time domain provided by an example of the present disclosure.

As shown in FIG. 7, the first communication end detects that the unlicensed channel is idle, one DIFS is spaced after detecting an idle state, and one RTS (corresponding to the aforementioned first RTS) is sent after the time corresponding to the DIFS ends, and the second communication end is in the retreat state and sends the A-CTS on the licensed channel. After receiving the A-CTS, the first communication end receives the C-RTS on the unlicensed channel. At this time, the third communication end around the first communication end may end the retreat time defined by the NAV corresponding to the RTS in advance.

Figure 8:
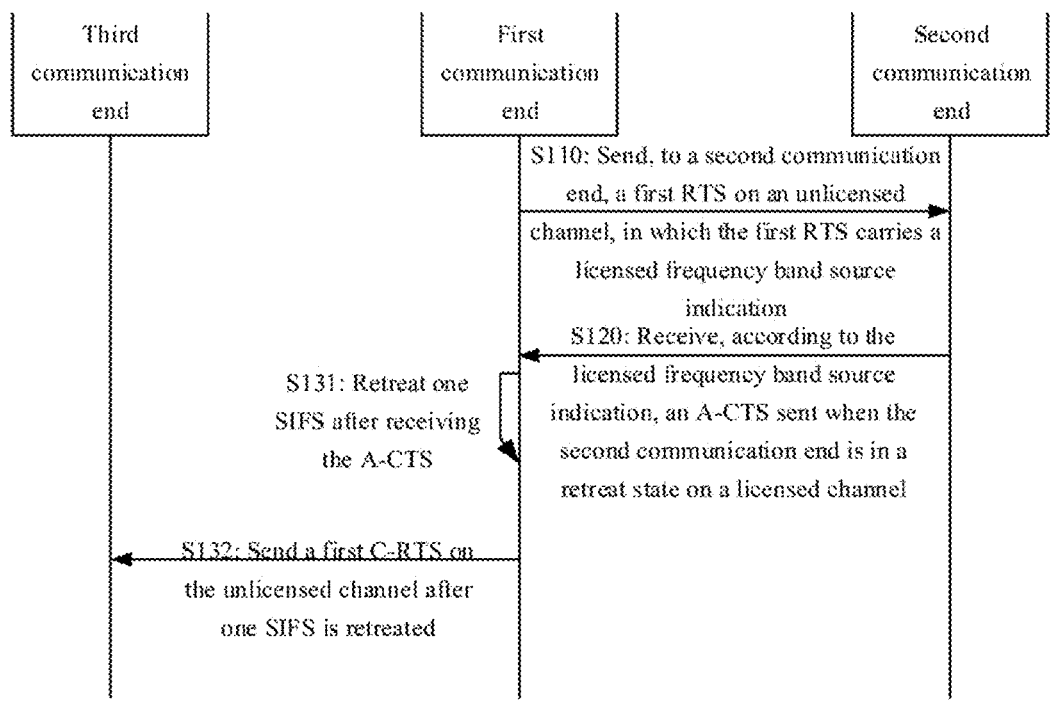
FIG. 8 is a schematic flow diagram of a frame transmission method provided by an example of the present disclosure.

In some examples, as shown in FIG. 8, S130 may include:
S131: one SIFS is retreated after receiving the A-CTS; and
S132: the first C-RTS is sent on the unlicensed channel after one SIFS is retreated.

CCA is performed on the unlicensed channel within the time corresponding to SIFS to determine whether the unlicensed channel is idle. If it is detected that the unlicensed channel is idle within the time corresponding to SIFS, the first C-RTS is sent on the unlicensed channel after the time corresponding to SIFS ends.

Figure 9:
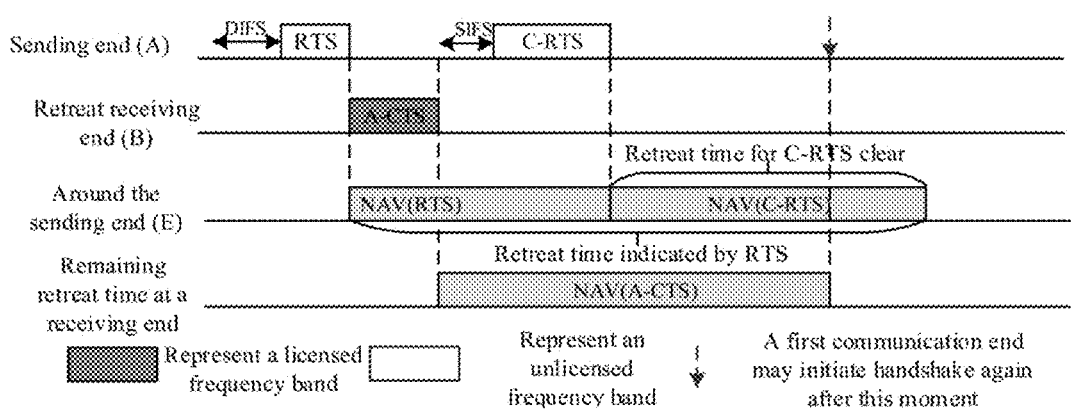
FIG. 9 is a schematic diagram of a handshake mechanism based on an unlicensed channel in a time domain provided by an example of the present disclosure.

In this way, the third communication end ends the retreat state after receiving the first C-RTS. As shown in FIG. 9, the time for the third communication end to exit the retreat state in advance is NAV (C-RTS).

As shown in FIG. 9, after the first RTS is sent, the third communication end will enter into the retreat state. A maintenance duration of the retreat state is NAV (RTS), and the maintenance duration may be a maximum retreat period, or a predefined arbitrary duration.

After receiving the A-CTS, the first communication end sends the C-RTS at one interval of SIFS in response to detecting that the unlicensed channel is idle. In this way, the third communication end will exit the retreat state in advance in response to receiving the C-RTS within the maintenance time of the NAV (RTS).

According to the time consumed by the transmission of each handshake frame, the third communication end is expected to exit the retreat state in response to determining that half of the NAV (RTS) remains.

Figure 10:
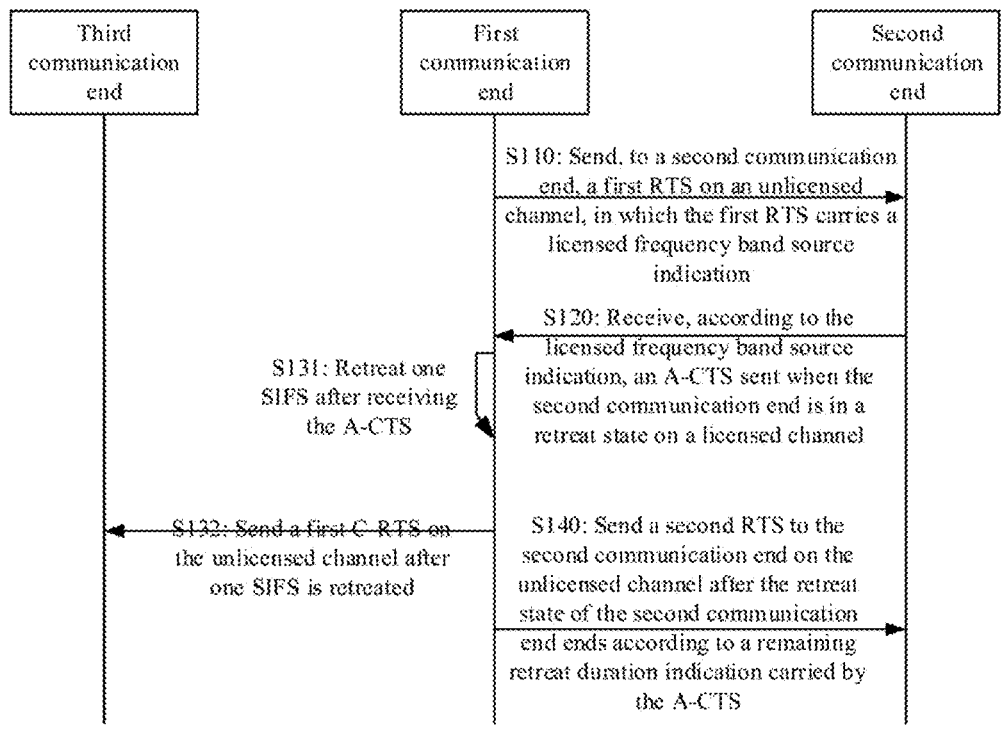
FIG. 10 is a schematic flow diagram of a frame transmission method provided by an example of the present disclosure.

In some examples, as shown in FIG. 10, the method further includes:
  S140: a second RTS is sent to the second communication end on the unlicensed channel after the retreat state of the second communication end ends according to a remaining retreat duration indication carried by the A-CTS.

The A-CTS carries the remaining duration for which the second communication end needs to continue to maintain the retreat state, and the remaining duration is referred to as the remaining retreat duration here, and is indicated by the remaining retreat duration. After learning the remaining retreat duration, if the first communication end needs to continue to send data to the second communication end on the unlicensed channel, the first communication end will send the second RTS to the second communication end after the retreat state of the second communication end ends.

Referring to FIG. 9, NAV(A-CTS) represents the remaining retreat duration when the second communication end sends the A-CTS. After receiving the A-CTS, the first communication end may initiate the next handshake after the remaining retreat duration indicated by the A-CTS ends. The next handshake between the first communication end and the second communication end may still be completed by using the aforementioned frame transmission method in the example of the present disclosure.

The sending timing of the second RTS further depends on whether the unlicensed channel detected by the first communication end is idle. For example, in some examples, the first communication end still keeps detecting the unlicensed channel when the second communication end is in the retreat state. If it is detected that the unlicensed channel is idle, the second RTS may be sent at the moment when the retreat state of the second communication end ends, so as to realize data sending from the first communication end to the second communication end as soon as possible.

In some other examples, the first communication end may stop CCA on the unlicensed channel for the purpose of saving its own power consumption during the time when the second communication end is in the retreat state according to the remaining retreat duration indication. After the second communication end ends the retreat state, the first communication end continues to perform CCA on the unlicensed channel. If a CCA detection result indicates that the unlicensed channel is idle, the first communication end broadcasts the second RTS to the second communication end on the unlicensed channel. In this way, when the second RTS reaches the second communication end, the second communication end exits the retreat state, and the second communication end may perform data interaction with the first communication end. At this time, the second communication end may broadcast one CTS on the unlicensed channel, so that a fourth communication end around the second communication end enters into the retreat state. The first communication end and the second communication end may perform data interaction after one interval of SIFS.

Here, the first communication end and the second communication end may continue to perform CCA on the unlicensed channel within the time corresponding to the interval of SIFS, thus the channel quality of the first communication end and the second communication end before performing data interaction is ensured, and wireless interference during data interaction caused by unexpected situations is reduced. The unexpected situations may include: a situation in which the previous detection result of the CCA of the unlicensed channel is wrong. If it is found that the unlicensed channel is not idle within the time of the interval of SIFS, the CCA of the unlicensed channel is maintained until it is detected again that the unlicensed channel is idle, and then the aforementioned S140 is performed.

In some examples, S140 may include: in response to detecting that the unlicensed channel is idle after the retreat state of the second communication end ends, after retreating one distributed inter-frame spacing (DIFS), the second RTS is sent to the second communication end on the unlicensed channel.

In the time of retreating the DIFS, CCA continues to be performed on the unlicensed channel, and the unlicensed channel continues to be detected if it is detected that the unlicensed channel is in a busy state again. The second RTS is sent if it is detected that the unlicensed channel remains in an idle state.

In some examples, the A-CTS may not carry the remaining retreat duration indication. After receiving the A-CTS, the first communication end directly sends the second RTS to the second communication end after one interval of maintenance duration of the retreat state.

Figure 11:
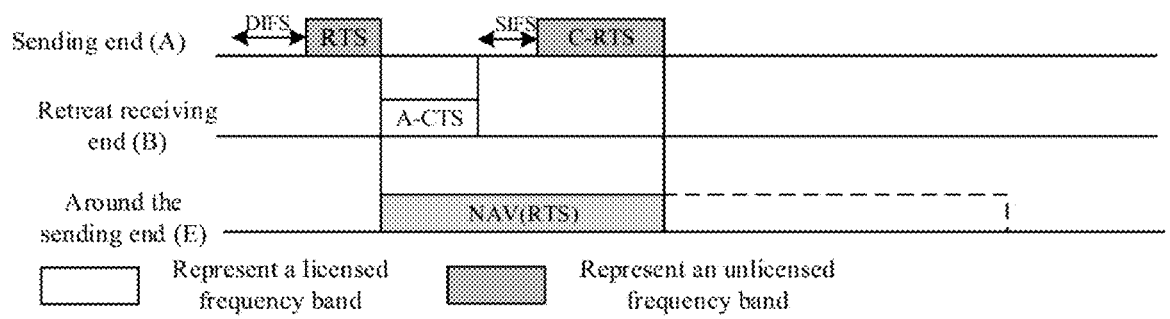
FIG. 11 is a schematic diagram of a handshake mechanism based on an unlicensed channel in a time domain provided by an example of the present disclosure.

In some examples, as shown in FIG. 11, the method further includes:
  the first CTS sent by the second communication end based on the first RTS is received on the unlicensed channel; and
  in response to receiving the first CTS, a data frame is sent to the second communication end on the unlicensed channel after one SIFS is retreated.

If the second communication end is not in the retreat state in response to receiving the first RTS, the second communication end broadcasts one CTS (namely, the first CTS) on the unlicensed channel, and the fourth communication end within the predetermined range of the second communication end will enter into the retreat state after receiving the first CTS. After receiving the first CTS, the first communication end prepares to enter into a state of sending data to the second communication end. After receiving the first CTS sent by the second communication end, the first communication end sends data to the second communication end at an interval of one SIFS.

In some examples, when the second communication end receives that the first RTS is in the retreat state, but the remaining retreat duration is less than one SIFS, the second communication end sends the first CTS after ending the retreat state. That is, at this time, the first communication end can still receive the first CTS. In this way, a situation that the first communication end and the second communication end need multiple handshakes due to the fact that the second communication end finds itself in the retreat state after receiving the first RTS, but the maintenance time of the retreat state (remaining retreat duration) is very short, and the A-CTS is still sent on the licensed channel is reduced, and the delay in sending data from the first communication end to the second communication end is also reduced.

Referring to FIG. 12, a device C detects that the channel is idle and sends the RTS to a device D, but because a device A and a device B are transmitting at this time, the device D that monitors performing of transmission of the device A and the device B remains in a retreat state. After receiving the RTS sent by device C, the device D feeds back the A-CTS on a licensed carrier indicated by the RTS, and indicates the device C to perform RTS retreat clearing. After receiving the A-CTS, the device C sends the C-RTS to its surrounding devices F so that device F can perform normal transmission with a device E.

A sending end (that is, corresponding to the above first communication end) sends an RTS frame to a receiving end (that is, corresponding to the above second communication end). The frame includes a retreat time field (the retreat time is from sending the RTS frame to the completion of data transmission) to indicate nodes around the sending end to retreat, a licensed frequency band resource indication field is further newly added, so that the receiving end in the retreat state can feed back the remaining retreat time to the sending end in time. The retreat time field carries the aforementioned first retreat duration.

The receiving end has two cases.

Case 1: The receiving end is not in the retreat state. In this way, after receiving the RTS from the sending end, the receiving end sets the retreat time field of the CTS according to the retreat time field of the RTS, sends the CTS to the sending end, and indicates the nodes around the receiving end to retreat. The retreat time is from monitoring of the CTS to completion of data transmission.

In case 2, the receiving end is in the retreat state. In this way, after receiving the RTS from the sending end, the receiving end cannot send the CTS on the unlicensed carrier because it is in the retreat state. The remaining retreat time of a channel is fed back on a licensed frequency band resource according to the licensed frequency band source indication in the RTS, so that the sending end sends an RTS clear indication (Clear-RTS) to clear the retreat state of its surrounding nodes, and thus other surrounding devices have the opportunity to access the unlicensed channel.

In this example of the present disclosure, the RTS carries the licensed frequency band resource indication and/or the retreat time field. By newly adding the licensed frequency band resource indication field in the RTS, the receiving end in the retreat state can timely feedback the remaining retreat duration to the sending end, which solves the problem of hidden nodes and avoids the problem of reducing the access efficiency of unlicensed frequency bands caused by long-term invalid retreat, and the system capacity of the NR-U is increased.

Figure 13:
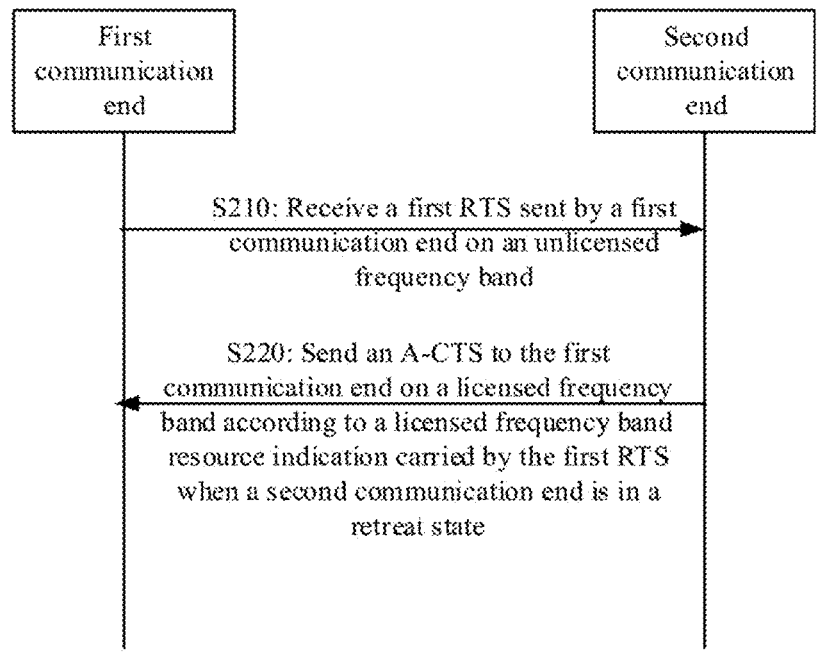
FIG. 13 is a schematic flow diagram of a frame transmission method provided by an example of the present disclosure.

As shown in FIG. 13, the present example provides a frame transmission method, applied to a second communication end, and including:

S210: a first RTS sent by a first communication end is received on an unlicensed frequency band; and S220: an A-CTS is sent to the first communication end on a licensed frequency band according to a licensed frequency band source indication carried by the first RTS when the second communication end is in a retreat state, in which the A-CTS is configured to trigger the first communication end to send a first C-RTS on the unlicensed frequency band, and the first C-RTS is used for instructing a third communication end to exit the retreat state, on the unlicensed frequency band, triggered based on the RTS.

The frame transmission method according to the example of the present disclosure is applied to the second communication end, and the second communication end may be a data receiving end.

When the first RTS sent by the first communication end is received on the unlicensed frequency band, its own state is determined. If the second communication end itself is in the retreat state, the A-CTS is sent to the first communication end on the licensed frequency band according to the licensed frequency band resource indication carried by the first RTS. The A-CTS informs the first communication end that the second communication end is currently in the retreat state, and the first communication end may broadcast the first C-RTS on the unlicensed channel by sending the CTS, so as to release a retreat state of a third communication end around the first communication end.

In some examples, the A-CTS carries a remaining retreat duration indication. The remaining retreat duration indication indicates a remaining retreat duration of the second communication end being in the retreat state, and is configured to allow the first communication end to determine the time of sending the second RTS.

If the A-CTS carries the remaining retreat duration indication to indicate the remaining duration for the second communication end to maintain in the retreat state, the first communication end can determine that the RTS needs to be resent to the second communication end at least after the time corresponding to the remaining retreat duration ends.

In some examples, the frame transmission method further includes:

a second CTS is sent on the unlicensed frequency band when the second communication end is not in the retreat state, in which the second CTS is used for instructing a fourth communication end to enter into the retreat state.

If the second communication end can directly send the second CTS on the unlicensed channel based on the retreat time indication carried by the first RTS in response to receiving the first RTS, the second CTS, on one hand, informs the fourth communication end around the second communication end to enter into a retreat state in which the unlicensed channel is not used for data receiving and sending, and on the other hand, informs the first communication end that it is not in the retreat state and can perform data interaction on the unlicensed channel.

Further, the sending the second CTS on the unlicensed frequency band when the second communication end is not in the retreat state, in which the second CTS is used for instructing the fourth communication end to enter into the retreat state, includes: the second CTS is send on the unlicensed frequency band according to a first retreat duration indication carried by the first RTS, in which the second CTS carries a second retreat duration indication. The second retreat duration indication is determined based on the first retreat duration indication. For example, a first retreat duration contained in the first retreat duration indication is subtracted from the time from when the second communication end receives the first RTS to the end of sending the second CTS to obtain a second retreat duration contained in the second retreat duration indication. The fourth communication end may enter into the retreat state based on the second retreat duration. That is, a maintenance duration for which the fourth communication end enters into the retreat state based on the second CTS is the second retreat duration.

The first retreat duration here is determined by the time needed for the first communication end to shake hands with the second communication end and the time needed for the first communication end to send data to the second communication end. In general, if the first communication end needs to send more data to the second communication end, the first retreat duration is longer.

Figure 14:
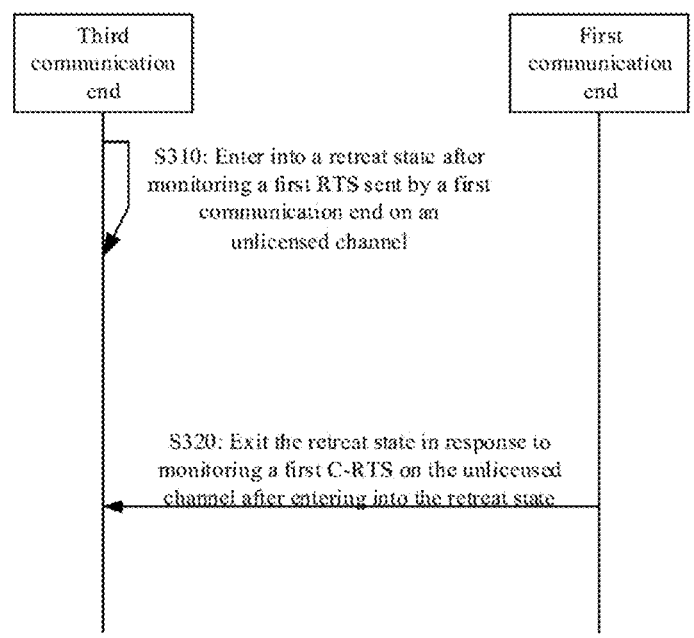
FIG. 14 is a schematic flow diagram of a frame transmission method provided by an example of the present disclosure.

As shown in FIG. 14, the present example provides a frame transmission method, applied to a third communication end, and including:
S310: a retreat state is entered after monitoring a first RTS sent by a first communication end on an unlicensed channel; and
S320: the retreat state is exited in response to monitoring a first clear-request to send (C-RTS) on the unlicensed channel after entering into the retreat state.

In the example of the present disclosure, the third communication end may be a communication terminal located within a predetermined range near a first communication end.

The C-RTS here includes: a handshake frame sent by the first communication end after receiving the A-CTS of the second communication end on the licensed channel, and the C-RTS is configured to trigger the third communication end to exit the retreat state entered based on the first RTS in advance.

If the first communication end sends the first RTS to the second communication end on the unlicensed channel, the third communication end can monitor it. The third communication end enters into the retreat state after monitoring the first RTS. Moreover, the duration that the third communication end maintains in the retreat state based on the first RTS is NAV (RTS). The NAV corresponding to a handshake mechanism between the communication ends on the unlicensed channel may be pre-written in a communication protocol. The communication protocol is pre-installed in the communication terminal, so the third communication end automatically enters into the retreat state after hearing the first RTS, and clearly knows that the duration of being in the retreat state based on the first RTS is determined based on NAV However, after entering into the retreat state, the third communication end will still monitor the unlicensed channel. If the first communication end sends the first C-RTS on the unlicensed channel, the third communication end will release its own retreat state in advance if the retreat duration is still left after receiving the first C-RTS. After the retreat state of the third communication end is released, on one hand, the third communication end may participate in competition of the unlicensed channel, and has more opportunities or earlier opportunities to receive and send data with other communication ends on the unlicensed channel. On the other hand, equivalently, when the second communication end is in the retreat state, the occupation of the unlicensed channel within a space range where the first communication end is located is released, thus resource waste of the unlicensed channel in the range where the first communication end is located due to the fact that the first communication end occupies the unlicensed channel but cannot interact data is reduced, and system capacity of a wireless communication system where the unlicensed channel is located is improved.

In some examples, the method further includes:
in response to determining that the first C-RTS is not monitored on the unlicensed channel, the retreat state is exited after the retreat duration determined based on the first RTS after entering into the retreat state.

If the third communication end does not monitor the first C-RTS within the time that it is in the retreat state after entering into the retreat state, the retreat state is directly maintained until the retreat duration determined by the first RTS ends, and the retreat state is exited.

Figure 15:
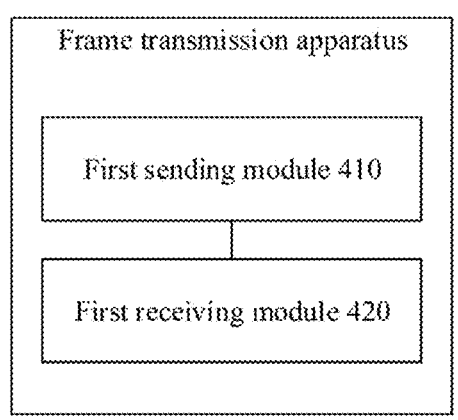
FIG. 15 is a schematic structural diagram of a frame transmission apparatus provided by an example of the present disclosure.

As shown in FIG. 15, the present example provides a frame transmission apparatus, applied to a first communication end, and including:
a first sending module 410, configured to send, to a second communication end, a first request to send (RTS) on an unlicensed channel, in which the first RTS carries a licensed frequency band source indication;
a first receiving module 420, configured to receive, according to the licensed frequency band source indication, an assist-clear to send (A-CTS) that is sent by the second communication ending a retreat state on a licensed channel; and
the first sending module 410, further configured to send, according to the A-CTS, a first clear-request to send (C-RTS) on the unlicensed channel, in which the first C-RTS is used for instructing a third communication end to exit the retreat state entered based on the first RTS.

In some examples, both the first sending module 410 and the first receiving module 420 may be program modules. After being executed by a processor, the program modules can implement sending of the first RTS, receiving of the A-CTS and sending of the first C-RTS.

In some other examples, the first sending module 410 and the first receiving module 420 may be software and hardware combination modules, and the software and hardware combination modules may include various programmable arrays. The programmable arrays include but are not limited to a complex programmable array or a field programmable array.

In further some other examples, the first sending module 410 and the first receiving module 420 may further be pure hardware modules. The pure hardware modules include but are not limited to a complex programmable array.

In some examples, the first sending module 410 is configured to retreat one short inter-frame space (SIFS) after receiving the A-CTS; and send the first C-RTS on the unlicensed channel after retreating one SIFS.

In some examples, the first sending module 410 is further configured to send a second RTS to the second communication end on the unlicensed channel after the retreat state of the second communication end ends according to a remaining retreat duration indication carried by the A-CTS.

In some examples, the first sending module 410 is configured to send the second RTS to the second communication end on the unlicensed channel in response to detecting that the unlicensed channel is idle and after one distributed inter-frame spacing (DIFS) is retreated.

In some examples, the first receiving module 420 is further configured to receive, on the unlicensed channel, the first CTS sent by the second communication end based on the first RTS; and
the first sending module 410 is configured to send a data frame to the second communication end on the unlicensed channel in response to receiving the first CTS after one SIFS is retreated.

Figure 16:
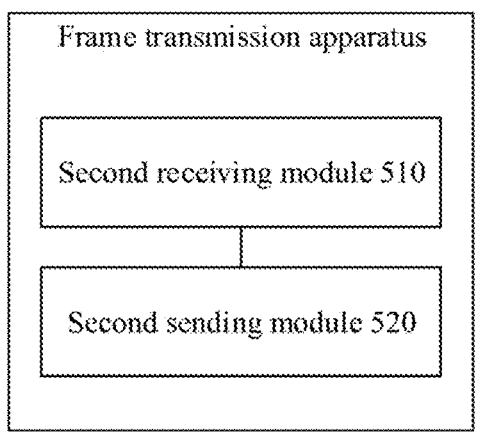
FIG. 16 is a schematic structural diagram of another frame transmission apparatus provided by an example of the present disclosure.

As shown in FIG. 16, the example of the present disclosure provides a frame transmission apparatus, applied to a second communication end, and including:

a second receiving module 510, configured to receive, on an unlicensed frequency band, a first request to send (RTS) sent by a first communication end; and a second sending module 520, configured to send, on a licensed frequency band, an assist-clear to send (A-CTS) to the first communication end according to a licensed frequency band source indication carried by the first RTS when the second communication end is in a retreat state, in which the A-CTS is configured to trigger the first communication end to send a first C-RTS on an unlicensed frequency band, and the first C-RTS is used for instructing a third communication end to exit the retreat state, on the unlicensed frequency band, triggered based on the RTS.

In some examples, both the second sending module 520 and the second receiving module 510 may be program modules. After being executed by a processor, the program modules can implement sending of the first RTS and sending of the A-CTS.

In some other examples, the second sending module 520 and the second receiving module 510 may be software and hardware combination modules, and the software and hardware combination modules may include various programmable arrays. The programmable arrays include but are not limited to a complex programmable array or a field programmable array.

In further some other examples, the second sending module 520 and the second receiving module 510 may further be pure hardware modules. The pure hardware modules include but are not limited to a complex programmable array.

In some examples, the A-CTS carries a remaining retreat duration indication. The remaining retreat duration indication indicates a remaining retreat duration when the second communication end is in the retreat state, and is configured to allow the first communication end to determine the time of sending a second RTS.

In some examples, the second sending module 520 is configured to send a second CTS is sent on the unlicensed frequency band when the second communication end is not in the retreat state, in which the second CTS is used for instructing a fourth communication end to enter into the retreat state.

Figure 17:
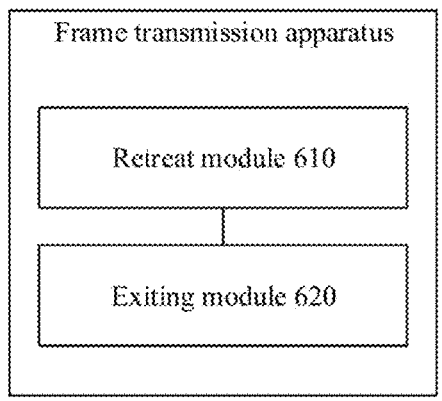
FIG. 17 is a schematic structural diagram of further another frame transmission apparatus provided by an example of the present disclosure.

As shown in FIG. 17, the present example provides a frame transmission apparatus, applied to a third communication end, and including:

a retreat module 610, configured to enter into a retreat state after monitoring a first RTS sent by a first communication end on an unlicensed channel; and an exiting module 620, configured to exit the retreat state in response to monitoring a first clear-request to send (C-RTS) on the unlicensed channel after entering into the retreat state.

In some examples, both the retreat module 610 and the exiting module 620 may be program modules. After being executed by a processor, the program modules can implement entry and exit of the retreat state.

In some other examples, the retreat module 610 and the exiting module 620 may be software and hardware combination modules, and the software and hardware combination modules may include various programmable arrays. The programmable arrays include but are not limited to a complex programmable array or a field programmable array.

In further some other examples, the retreat module 610 and the exiting module 620 may further be pure hardware modules. The pure hardware modules include but are not limited to a complex programmable array.

In some examples, the exiting module 620 is further configured to exit the retreat state after a retreat duration determined based on the first RTS after entering into the retreat state and in response to determining that a first C-RTS is not monitored on the unlicensed channel.

Figure 18:
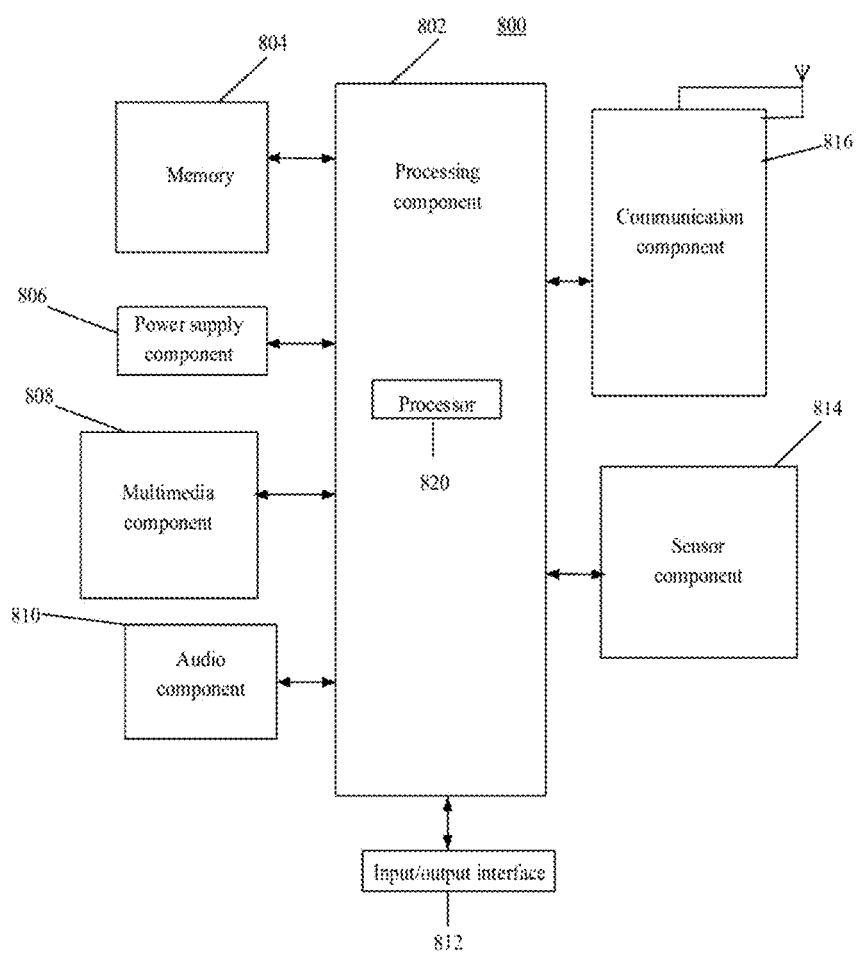
FIG. 18 is a schematic structural diagram of a terminal provided by an example of the present disclosure.

FIG. 18 is a terminal shown according to an example. The terminal may specifically be a mobile phone, a computer, a digital broadcast terminal, a message transceiving device, a game console, a tablet device, a medical device, a fitness device, a personal digital assistant, and the like.

Referring to FIG. 18, the terminal 800 may include one or more of the following components: a processing component 802, a memory 804, a power supply component 806, a multimedia component 808, an audio component 810, an input/output (I/O) interface 812, a sensor component 814, and a communication component 816.

The processing component 802 usually controls overall operation of the terminal 800, such as operations associated with displaying, telephone calling, data communication, a camera operation and a record operation. The processing component 802 may include one or more processors 820 to execute an instruction, so as to complete all or part of steps of the above method. In addition, the processing component 802 may include one or more modules, so as to facilitate interaction between the processing component 802 and other components. For example, the processing component 802 may include a multimedia module, so as to facilitate interaction between the multimedia component 808 and the processing component 802.

The memory 804 is configured to store various types of data so as to support operations on the terminal 800. Examples of these data include instructions of any application program or method configured to be operated on the terminal 800, contact data, telephone directory data, messages, pictures, videos, and the like. The memory 804 may be implemented by any type of volatile or nonvolatile storage device or their combinations, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk.

The power supply component 806 provides electric power for various components of the terminal 800. The power supply component 806 may include a power management system, one or more power sources, and other components associated with generating, managing and distributing electric power for the terminal 800.

The multimedia component 808 includes a screen providing an output interface between the terminal 800 and a user. In some examples, the screen may include a liquid crystal display (LCD) and a touch panel (TP). If the screen includes the touch panel, the screen may be implemented as a touch screen so as to receive an input signal from the user. The touch panel includes one or more touch sensors to sense touching, swiping and gestures on the touch panel. The touch sensor may not only sense a boundary of a touching or swiping action, but also detect duration and pressure related to the touching or swiping operation. In some examples, the multimedia component 808 includes a front camera and/or a back camera. When the terminal 800 is in an operation mode, such as a shooting mode or a video mode, the front camera and/or the back camera may receive external multimedia data. Each front camera and each back camera may be a fixed optical lens system or have a focal length and optical zooming capability.

The audio component 810 is configured to output and/or input an audio signal. For example, the audio component 810 includes a microphone (MIC). When the terminal 800 is in the operation mode, such as a call mode, a recording mode or a speech recognition mode, the microphone is configured to receive an external audio signal. The received audio signal may be further stored in the memory 804 or sent via the communication component 816. In some examples, the audio component 810 further includes a speaker for outputting an audio signal.

The I/O interface 812 provides an interface between the processing component 802 and a peripheral interface module, and the above peripheral interface module may be a keyboard, a click wheel, buttons, etc. These buttons may include but are not limited to: a home button, a volume button, a start button and a lock button.

The sensor component 814 includes one or more sensors for providing state evaluations of all aspects for the terminal 800. For example, the sensor component 814 may monitor an on/off state of the terminal 800 and relative positioning of components, for example, the components are a display and a keypad of the terminal 800. The sensor component 814 may further detect position change of the terminal 800 or one component of the terminal 800, whether there is contact between the user and the terminal 800, azimuth or speed up/speed down of the terminal 800, and temperature change of the terminal 800. The sensor component 814 may include a proximity sensor, and is configured to detect existence of a nearby object without any physical contact. The sensor component 814 may further include an optical sensor, such as a CMOS or CCD image sensor, for use in imaging application. In some examples, the sensor component 814 may further include an acceleration sensor, a gyroscope sensor, a magnetic sensor, a pressure sensor or a temperature sensor.

The communication component 816 is configured to facilitate wired or wireless communication between the terminal 800 and other devices. The terminal 800 may access a wireless network based on a communication standard, such as WiFi, 2G or 3G, or their combination. In an example, the communication component 816 receives a broadcast signal or broadcast related information from an external broadcast management system via a broadcast channel. In an example, the communication component 816 further includes a near-field communication (NFC) module so as to facilitate short-range communication. For example, the NFC module may be implemented based on a radio frequency identification (RFID) technology, an infrared data association (IrDA) technology, an ultra wide band (UWB) technology, a Bluetooth (BT) technology and other technologies.

In the example, the terminal 800 may be implemented by one or more application specific integrated circuits (ASICs), digital signal processors (DSPs), digital signal processing devices (DSPDs), programmable logic devices (PLDs), field-programmable gate arrays (FPGAs), controllers, microcontrollers, microprocessors or other electronic elements for executing the above method.

In the example, a non-temporary computer readable storage medium including an instruction is further provided, such as a memory 804 including an instruction. The above instruction may be executed by a processor 820 of the terminal 800 so as to complete the above method. For example, the non-temporary computer readable storage medium may be an ROM, a random access memory (RAM), a CD-ROM, a magnetic tape, a floppy disk, an optical data storage device and the like.

Figure 19:
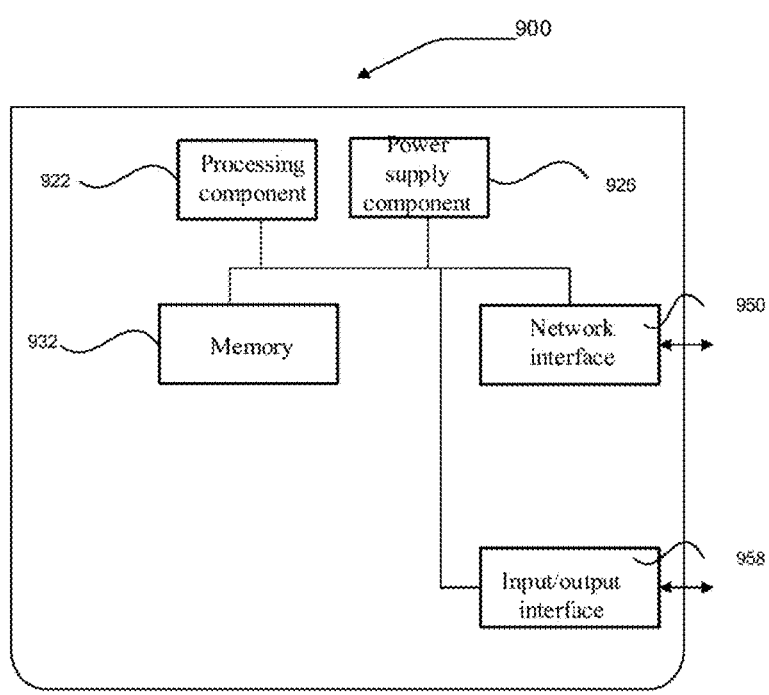
FIG. 19 is a schematic structural diagram of a base station provided by an example of the present disclosure.

FIG. 19 is a schematic diagram of a base station. Referring to FIG. 19, a base station 900 includes a processing component 922, which further includes one or more processors, and a memory resource represented by a memory 932, for storing instructions executable by the processing component 922, such as an application program. An application program stored in the memory 932 may include one or more modules, each corresponding to a set of instructions. In addition, the processing component 922 is configured to execute the instructions to execute any frame transmission method shown in FIG. 3 to FIG. 5.

The base station 900 may further include a power supply component 926 configured to execute power management of the base station 900, a wired or wireless network interface 950 configured to connect the base station 900 to a network, and an input/output (I/O) interface 958. The base station 900 may operate based on an operating system stored in a memory 932, such as Windows Server™, Mac OS X™, Unix™, Linux™, FreeBSD™ or the like.

An example of the present disclosure further provides a communication device, and the communication device may be a terminal or a base station. The communication device includes:

a transceiver;

a memory; and a processor, connected with an antenna and the memory respectively, for controlling wireless signal receiving and sending of the transceiver by executing a computer executable instruction stored on the memory, so as to implement the frame transmission method provided by any aforementioned example, for example, any frame transmission method shown by FIG. 3 to FIG. 5.

An example of the present disclosure further provides a non-transitory computer readable storage medium. The non-transitory computer readable storage medium stores a computer-executable instruction. The computer-executable instruction, after being executed by a processor, can implement the frame transmission method provided by any aforementioned technical solution, for example, at least one of the methods shown in FIG. 2, FIG. 4 to FIG. 5.

Those of skill in the art will easily figure out other implementation solutions of the present disclosure after considering the specification and practicing the disclosure disclosed here. The present disclosure intends to cover any transformation, usage or adaptive change of the present disclosure, and these transformations, usages or adaptive changes conform to a general principle of the present disclosure and include common general knowledge or conventional technical means in the technical field not disclosed by the present disclosure. The specification and the examples are merely regarded as being for example, and the true scope and spirit of the present disclosure are indicated by the following claims.

It will be appreciated that the present disclosure is not limited to the exact structure that has been described above and shown in the accompanying drawings, and that various modifications and changes may be made without departing from the scope of the present disclosure. The scope of the present disclosure is limited merely by the appended claims.

What is claimed is:

1. A frame transmission method, comprising:
sending, by a first communication end to a second communication end, a first request to send (RTS) on an unlicensed channel, wherein the first RTS carries a licensed frequency band source indication;
receiving, by the first communication end according to the licensed frequency band source indication, an assist-clear to send (A-CTS) that is sent by the second communication end in a retreat state on a licensed channel; and
sending, by the first communication end according to the A-CTS, a first clear-request to send (C-RTS) on the unlicensed channel, wherein the first C-RTS is configured for instructing a third communication end to exit the retreat state entered based on the first RTS.

2. The method according to claim 1, wherein sending, according to the A-CTS, the first clear-request to send (C-RTS) on the unlicensed channel comprises:
retreating one short interframe space (SIFS) after receiving the A-CTS; and
sending the first C-RTS on the unlicensed channel after one SIFS is retreated.

3. The method according to claim 1, further comprising:
sending a second RTS to the second communication end on the unlicensed channel after the retreat state of the second communication end ends according to a remaining retreat duration indication carried by the A-CTS.

4. The method according to claim 3, wherein sending the second RTS to the second communication end on the unlicensed channel comprises:
sending the second RTS to the second communication end on the unlicensed channel in response to detecting that the unlicensed channel is idle and after one distributed inter-frame spacing (DIFS) is retreated.

5. The method according to claim 1, further comprising:
receiving, on the unlicensed channel, a first clear to send (CTS) sent by the second communication end based on the first RTS; and
sending a data frame to the second communication end on the unlicensed channel in response to receiving the first CTS after one SIFS is retreated.

6. A frame transmission method, comprising:
receiving, by a second communication end on an unlicensed frequency band, a first request to send (RTS) sent by a first communication end; and
sending, by the second communication end on a licensed frequency band, an assist-clear to send (A-CTS) to a first communication end according to a licensed frequency band source indication carried by the first RTS when the second communication end is in a retreat state, wherein the A-CTS is configured to trigger the first communication end to send a first clear-request to send (C-RTS) on the unlicensed frequency band, and the first C-RTS is configured for instructing a third communication end to exit the retreat state triggered based on the RTS on the unlicensed frequency band.

7. The method according to claim 6, wherein the A-CTS carries a remaining retreat duration indication, the remaining retreat duration indication indicates a remaining retreat duration of the second communication end being in the retreat state, and the remaining retreat duration indication is configured to allow the first communication end to determine time of sending a second RTS.

8. The method according to claim 6, further comprising:
sending a second clear to send (CTS) on the unlicensed frequency band when the second communication end is not in the retreat state, wherein the second CTS is configured for instructing a fourth communication end to enter into the retreat state.

9. A frame transmission method, comprising:
entering, by a third communication end, into a retreat state after monitoring a first request to send (RTS) sent by a first communication end on an unlicensed channel; and
exiting, by the third communication end, the retreat state in response to monitoring a first clear-request to send (C-RTS) sent by the first communication end on the unlicensed channel after entering into the retreat state, wherein the first C-RTS is sent by the first communication end after receiving an A-CTS sent by a second communication end on a licensed channel, and the A-CTS is sent by the second communication end after receiving the first RTS when the second communication end is in a retreat state, based on a licensed frequency band source indication in the first RTS.

10. The method according to claim 9, further comprising:
in response to determining that the first C-RTS is not monitored on the unlicensed channel, exiting the retreat state after a retreat duration determined based on the first RTS after entering into the retreat state.

11. A communication device, comprising:
a transceiver;
a memory; and
a processor, connected with the transceiver and the memory respectively, for controlling the transceiver to receive and send a wireless signal by executing a computer executable instruction stored on the memory, so as to implement the method provided by claim 1.

12. A non-transitory computer-readable storage medium, wherein the non-transitory computer-readable storage medium stores a computer executable instruction; and the computer executable instruction, after being executed by a processor, can implement the method provided by claim 1.

13. The method according to claim 2, further comprising:
receiving, on the unlicensed channel, a first clear to send (CTS) sent by the second communication end based on the first RTS; and
sending a data frame to the second communication end on the unlicensed channel in response to receiving the first CTS after one SIFS is retreated.

14. The method according to claim 3, further comprising:
receiving, on the unlicensed channel, a first clear to send (CTS) sent by the second communication end based on the first RTS; and
sending a data frame to the second communication end on the unlicensed channel in response to receiving the first CTS after one SIFS is retreated.

15. The method according to claim 4, further comprising:
receiving, on the unlicensed channel, a first clear to send (CTS) sent by the second communication end based on the first RTS; and
sending a data frame to the second communication end on the unlicensed channel in response to receiving the first CTS after one SIFS is retreated.

16. The method according to claim 7, further comprising:
sending a second CTS on the unlicensed frequency band when the second communication end is not in the retreat state, wherein the second clear to send (CTS) is configured for instructing a fourth communication end to enter into the retreat state.

17. A communication device, comprising:
a transceiver;
a memory; and
a processor, connected with the transceiver and the memory respectively, for controlling the transceiver to receive and send a wireless signal by executing a computer executable instruction stored on the memory, so as to implement the method provided by claim 6.

18. A communication device, comprising:
a transceiver;
a memory; and
a processor, connected with the transceiver and the memory respectively, for controlling the transceiver to receive and send a wireless signal by executing a computer executable instruction stored on the memory, so as to implement the method provided by claim 9.

19. A non-transitory computer-readable storage medium, wherein the non-transitory computer-readable storage medium stores a computer executable instruction; and the computer executable instruction, after being executed by a processor, can implement the method provided by claim 6.

20. A non-transitory computer-readable storage medium, wherein the non-transitory computer-readable storage medium stores a computer executable instruction; and the computer executable instruction, after being executed by a processor, can implement the method provided by claim 9.

* * * * *